Patented July 13, 1937

2,087,199

UNITED STATES PATENT OFFICE 2,087,199

AGE RESISTOR

Albert M. Clifford, Stow, Ohio, assignor to Wingfoot Corporation, Wilmington, Del., a corporation of Delaware No Drawing. Application February 8, 1934,
Serial No. 710,327

14 Claims. (Cl. 18—50)

This invention relates to the retarding of the ageing of deteriorable hydrocarbon compositions; more particularly, to the use in rubber, balata, gutta percha, transformer oils, gasoline and other deteriorable hydrocarbon compositions of age retarders of the kind hereinafter set forth. The substances to which the invention relates have been found to protect against deterioration from such influences as heat, light and oxygen. They have also been found, in the case of rubber, to materially enhance the resistance to deterioration by flexing. In general, they accomplish various desirable ends, among them, in the case of rubber, that of imparting improved tensile strength to the treated product and, in the case of gasoline, of preventing the formation of gums and gummy materials.

It has been observed heretofore that certain aromatic hydroxy compounds such as hydroquinone may, when dissolved or otherwise dispersed in a liquid vehicle, be interacted with amines to produce addition products which, upon their incorporation in unvulcanized rubber, both accelerate the rate of vulcanization thereof and improve the ageing properties of the resulting rubber product. Typical of such materials are the products disclosed in U. S. Patents Nos. 1,747,186 and 1,757,944. Such materials have, however, never been used to any great extent either as accelerators of vulcanization or to retard ageing, probably for the reasons that other compounds are more efficient accelerators and still other compounds, although having little or no accelerating action, are better age retarders. So far as known, they have not been employed to any extent in hydrocarbon compositions other than rubber.

This invention resides in the discovery that the composite reaction products obtained by condensing primary aromatic amines with poly hydroxy aromatic compounds in the manner hereinafter described constitute unusually satisfactory age retarders for deteriorable hydrocarbon compositions. While the constitution of the composite reaction products of the invention is not entirely known, the composite reaction products in question have been found to consist of a mixture of materials of which a number can be definitely identified. Where, for example, the primary aromatic amine employed in the reaction may be represented by the formula RNH₂ and the poly hydroxy aromatic compound by the formula HO—R'—OH, three of the principal materials embraced by the composite reaction product can be shown to have the structural formulae (1) R—NH—R'—NH—R, (2) R—NH—R'—OH and (3) R—NH—R. Other products which probably form are primary and tertiary amines of the structural formulae (4) R—N—H—R'—NH₂, (5) 

and (6) 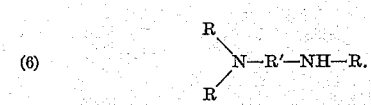

It is believed that other high molecular weight condensation products of unknown constitution also form. In general, composite reaction products containing large proportions of the products represented by Formulae (1), (2) and (3) are preferred; indeed, for many purposes the composite reaction products of the invention may to good advantage include as much as 50% of the product exemplified by Formula (3).

It is preferable to remove from the composite reaction products, particularly if they are to be used in rubber, any small amounts of inorganic impurities and the larger part of any of the more volatile primary amines that may be present. The removal of these primary amines is especially desirable in case the product is to be employed in vulcanizable rubber compositions containing substituted or unsubstituted mercaptan accelerators, as primary amines exert a pronounced activating effect on such accelerators. The precise manner of removal of inorganic impurities and the more volatile primary amines may be any known to the art. In the case of the more volatile primary amines, either steam distillation of the composite reaction product or extraction with a dilute acid such as dilute hydrochloric acid will in general be found to be suitable.

In preparing the composite reaction products of the present invention, it is necessary to effect a condensation reaction with the attendant splitting off of water. For best results, it is desirable to employ a small amount of a suitable condensation catalyst, generally in amounts from 0.1% to 1.0%, although larger quantities may be employed in certain cases. It is not invariably necessary that a catalyst be employed, particularly if relatively high temperatures are used. The reaction is most efficiently carried out in a closed vessel and thus at superatmospheric pressures, although this feature likewise may be eliminated in certain instances. The temperatures required are upwards of 150° C., generally above 200° C. and sometimes as high as 350° C. The time of reaction will vary somewhat, but in nearly all cases a period of more than five hours is necessary and sometimes as much as twenty-five hours.

The proportions of the reactants may be varied greatly, although in every instance it is desirable that at least one mol. of the primary aromatic amine be present for each mol. of the poly hydroxy aromatic compound. Products obtained under conditions pursuant to which a ratio of four or five mols of the primary aromatic amine to one mol. of the poly hydroxy aromatic compound is employed have been found to be excellent age retarders for rubber. However, products prepared from as high as 10 mols of the primary aromatic amine for each mol. of the poly hydroxy aromatic compound have also been found to constitute very satisfactory age retarders. It will thus be apparent that the reacting materials may be varied within wide limits.

The invention will be more fully described in and by the following illustrative examples.

*Example 1*

To 110 parts by weight (one mol.) of technical hydroquinone are added 372 parts by weight (4 mols) of aniline and 225 parts by weight of anhydrous calcium chloride. The mixture is heated in an autoclave for a period of approximately 7 hours at a temperature which may vary above or below, but should preferably be in the neighborhood of 300° C. By the time the autoclave has cooled somewhat, its contents will be found to have separated into two layers, an upper oily layer consisting principally of the composite reaction product of the invention and a lower layer of fused calcium chloride which can be removed with difficulty from the autoclave. Upon being decanted off and cooled, the oily layer is obtained as a dark semi-crystalline mass which is preferably subjected to steam distillation to remove unchanged aniline, of which approximately 76 parts by weight are recovered. After having been drained and dried, the residue remaining in the apparatus after the distillation, comprising the reaction product of the invention, becomes partially crystalline. It may, if desired, be washed with a small amount of aqueous alcohol, filtered and heated until dry. In either case, the composite reaction product of the invention is obtained in excellent yield in the form of a partially crystalline material melting over a range of from 75° C. to 95° C.

*Example 2*

To 110 parts (one mol.) of hydroquinone are added 465 parts (5 mols) of aniline and 5.8 parts of zinc chloride. The mixture is heated in a copper lined autoclave for a period of 8 hours at a temperature of approximately 330° C. The resulting mass is purified by stirring it thoroughly in approximately 1000 parts of water, to which are then added 300 parts of concentrated hydrochloric acid. A granular product results. Upon being filtered and thoroughly washed with water, the composite reaction product of the invention is obtained in a yield of approximately 238 parts.

*Example 3*

A mixture of 300 parts (3.2 mols) of aniline, 342 parts (1.5 mols) of di(p-hydroxy phenyl)2-2 propane having the formula

and 4 parts of aluminum chloride are reacted in an autoclave for a period of 18 hours at a temperature of 340–360° C. A maximum pressure of 600 pounds per square inch is obtained after the first two hours. After having been removed from the autoclave, the mass is fractionally distilled, the first two fractions obtained respectively comprising 15 parts of water and 297 parts of a liquid boiling at 150–220° C. believed to be principally aniline and a substance phenolic in nature. Upon further distillation, 43 parts of a fraction boiling at 80–138° C. at 4 mm. pressure, 197 parts of a fraction boiling at 140–250° C. at 4 mm. pressure, and 40 parts of a high boiling resinous material are obtained. The 43 part and 197 part fractions are mixed and re-distilled at 2 mm. pressure, whereupon are obtained 170 parts of a composite reaction product, an oily liquid boiling over a range of 140–195° C. at 2 mm. pressure, principally at 158–165° C.

*Example 4*

A mixture of 465 parts (5 mols) of aniline, 126 parts (1 mol.) of toluhydroquinone and 2.95 parts of zinc chloride is heated for a period of 9 hours at a temperature of 330° C. A tarry product is obtained which is washed with a solution comprising 1200 parts of water and 415 parts of concentrated hydrochloric acid of specific gravity 1.19. The residue is then taken up in approximately 400 parts of alcohol and diluted with approximately 450 parts of benzene. If the solution is allowed to stand for several days, there is obtained a considerable quantity of very dark crystals. Upon being filtered and dried, these crystals, the composite reaction product of the invention, are obtained in the form of a dark gray powder melting at 90–95° C.

*Example 5*

A mixture of 475 parts (4.44 mols) of mixed toluidines (largely ortho and para toluidines), 110 parts (1 mol.) of hydroquinone and 3 parts of aluminum chloride is heated in an autoclave for a period of 7 hours at a temperature of 340° C. The product is then distilled. There are obtained 278 parts of mixed toluidines and 155 parts of a composite reaction product boiling at 130–260° C. at 2 mm. pressure the major portion of which has been found to boil at 170–180° C. at 2 mm. The product boiling at 130–260° C. at 2 mm. pressure constitutes the composite reaction product of the invention and may be employed as an age retarder as herein described.

*Example 6*

A mixture of 465 parts (5 mols) of aniline, 2.9 parts of stannic chloride (SnCl$_4$.5H$_2$O) and 115 parts of methylene dicresols, the latter being a viscous oil prepared by reacting at a temperature below 70° C. and in the presence of a trace of hydrochloric acid mixed cresols and formaldehyde in the proportion of two mols of the mixed cresols to one mol. of the formaldehyde, is reacted in an autoclave for a period of eight hours at a temperature of 340° C. The product is filtered to remove inorganic impurities and distilled to eliminate low boiling constitutents. The portion boiling above 250° C. at atmospheric pressures, constituting the composite reaction product of the invention, may be employed to good advantage for the retarding of the ageing of deteriorable hydrocarbon compositions.

*Example 7*

A composite reaction product of hydroquinone and aniline similar to, but not identical with, that of Example 1 may be prepared by adding one mol. of undissolved hydroquinone to 4 mols of aniline and 2 mols of anhydrous calcium chloride, omitting any solvents other than the aniline itself. The mixture is heated for a period of 8 to 10 hours at a temperature which at the outset may conveniently be as low as 150 to 160° C., but which during the major part of the reaction period may well be somewhat above these temperatures. Two layers are formed in the reaction vessel, an upper oily crystalline layer and a lower layer which consists principally of a hard cake or hydrated calcium chloride. The upper layer is separated from the lower layer by any desired method, as by decanting, after which the crystalline portion thereof is filtered off. The filtrate is then subjected to steam distillation in order to remove excess aniline, after which the residue in the distillation apparatus is preferably drained and dried. The resulting semi-crystalline mass may, if desired, be washed with benzene, alcohol or the like and dried. The composite reaction product so obtained is believed to consist principally of compounds of the order of those of Formulae (1), (2), and (3), above.

It will be understood that these examples are but illustrative of the invention and that numerous other composite reaction products of primary aromatic amines and poly hydroxy aromatic compounds may be similarly prepared. The methods of preparation of many of these composite reaction products are found in the literature of chemistry, as, for example, at Berichte 16:2799 (1883). It will accordingly be understood that the methods of preparation of these products are not claimed as the present invention, but rather the use in deteriorable hydrocarbon compositions of the composite reaction products resulting therefrom.

Examples of hydroxy compounds which may be employed in the practice of the invention in lieu of those mentioned above are catechol, resorcinol, xylohydroquinone, the various mono alkyl ethers of pyrogallol, the various mono aryl ethers of pyrogallol, para para' dihydroxy diphenylamine, dihydroxy biphenyl, dihydroxy bitolyl, dihydroxy diphenylene oxide, dihydroxy fluorene, dihydroxy acenaphthene, dihydroxy diphenyl oxide, dihydroxy diphenyl sulphide, dihydroxy phenanthrene, dihydroxy dinaphthyl mono sulphide, dihydroxy dinaphthyl disulphide, dihydroxy anthraquinone, dihydroxy carbazole, dihydroxy binaphthyl, para para' dihydroxy diphenyl methane, dihydyroxy benzo phenone, dihydroxy diphenyl ethane, dihydroxy triphenyl methane, pyrocatechol, phloroglucinal, chlor hydroquinone and aurin.

Similarly, numerous other primary aromatic amines may be substituted for the primary amines given in the above examples. Illustrative are the xylidenes, the amino phenols, the amino cresols, the amino naphthols, alpha naphthylamine, beta naphthylamine, alpha tetra hydro naphthylamine, beta tetra hydro naphthylamine, and beta methyl alpha naphthylamine. Still others are para amino biphenyl, para para' diamino diphenyl methane, 2-amino fluorene, 2-7 diamino fluorene, benzidine, tolidine, the phenetidines, the anisidines, 3-amino acenaphthene, 1-amino 2-methyl naphthalene, di (para amino phenyl) 2-2' propane, meta phenylene diamine, para phenylene diamine, the several naphthylene diamines and meta tolylene diamine.

Likewise, instead of the condensation catalysts previously disclosed, any other such catalyst may be employed, examples being iodine, sodium bisulphate, potassium bisulphate, titanium chloride, ferric chloride, aluminum fluoride and aluminum bromide.

While the composite reaction products of this invention are in and of themselves excellent age retarders for various purposes, they may be employed, if desired, in conjunction with other materials. Thus when used for retarding the ageing of rubber, other age retarders may be mixed with the composite reaction products of this invention and the mixture incorporated in a vulcanizable rubber composition or, if preferred, the two age retarding compositions may be added separately to the rubber. Exemplary of such other materials are phenyl alpha naphthylamine, phenyl beta naphthylamine and the composite reaction products of primary cyclic amines and mono hydroxy aromatic compounds. It will be understood that such added material may be separately incorporated in the rubber or, by inclusion of the appropriate reactants in the reaction mixture, formed in situ at the time the composite reaction products of this invention are prepared.

The composite reaction products of this invention may be employed to advantage as age retarders for rubber. They may be employed advantageously in substantially any of the standard rubber formulae, the following being one in which they have been found to give good results:

| | Parts by weight |
|---|---|
| Extracted pale crepe rubber | 100 |
| Zinc oxide | 5 |
| Sulphur | 3 |
| Stearic acid | 1.5 |
| Hexamethylene tetramine | 1 |
| Age retarder | 1 |

As pointed out, they may also be employed in transformer oils, gasoline, etc.

Rubber samples prepared in accordance with the foregoing formula were subjected to vulcanization for varying periods of time and then tested to ascertain their physical characteristics. One set from each type of stock was tested immediately for tensile strength and elasticity while a second set was subjected to ageing in a Bierer-Davis bomb for 6 days in oxygen at 50° C. and 150 pounds per square inch. At the conclusion of the 6-day period, the samples were removed from the bomb and subjected to physical tests corresponding to those conducted upon the unaged samples.

It is evident from the following table that rubber compositions containing even small proportions of the age retarders of this invention resist deterioration remarkably well. Similar compositions not containing the age retarders, upon being subjected to corresponding tests, increase in weight in the neighborhood of 10% and lose almost all their tensile and elongation properties. The following data were obtained:

Reaction product of hydroquinone and aniline (Example 1)

| Cure in mins. | Original | | | | Aged | | | | Pct. wt. inc. |
|---|---|---|---|---|---|---|---|---|---|
| | Ult. tens. | Max. elg. | Load kgs/cm² 500% | Load kgs/cm² 700% | Ult. tens. | Max. elg. | Load kgs/cm² 500% | Load kgs/cm² 700% | |
| 30/40# | 132 | 870 | 16 | 53 | 156 | 820 | 23 | 82 | -------- |
| 50 | 178 | 815 | 25 | 95 | 190 | 770 | 32 | 130 | -------- |
| 70 | 200 | 775 | 33 | 133 | 195 | 700 | 50 | 195 | -------- |

Reaction product of hydroquinone and aniline (Example 2)

| Cure in mins. | Ult. tens. | Max. elg. | 500% | 700% | Ult. tens. | Max. elg. | 500% | 700% | Pct. wt. inc. |
|---|---|---|---|---|---|---|---|---|---|
| 35/285° F | 121 | 885 | 14 | 42 | 121 | 820 | 18 | 62 | .01 |
| 50 | 136 | 805 | 20 | 72 | 143 | 760 | 27 | 100 | .03 |
| 70 | 147 | 735 | 29 | 116 | 164 | 745 | 32 | 126 | .04 |

Reaction product of di (p-hydroxy phenyl) 2-2 propane and aniline (Example 3)

| Cure in mins. | Ult. tens. | Max. elg. | 500% | 700% | Ult. tens. | Max. elg. | 500% | 700% | Pct. wt. inc. |
|---|---|---|---|---|---|---|---|---|---|
| 35/285° F | 97 | 880 | 12 | 34 | 61 | 845 | 10 | 27 | .39 |
| 50 | 105 | 835 | 15 | 46 | 72 | 800 | 14 | 39 | .48 |
| 70 | 123 | 780 | 21 | 74 | 78 | 725 | 20 | 67 | .62 |

Reaction product of toluhydroquinone and aniline (Example 4)

| Cure in mins. | Ult. tens. | Max. elg. | 500% | 700% | Ult. tens. | Max. elg. | 500% | 700% | Pct. wt. inc. |
|---|---|---|---|---|---|---|---|---|---|
| 35/285° F | 103 | 915 | 11 | 30 | 115 | 850 | 16 | 46 | -------- |
| 50 | 110 | 835 | 15 | 49 | 120 | 775 | 21 | 75 | .02 |
| 70 | 143 | 805 | 19 | 73 | 142 | 745 | 28 | 107 | .05 |

Reaction product of hydroquinone and mixed toluidines (Example 5)

| Cure in mins. | Ult. tens. | Max. elg. | 500% | 700% | Ult. tens. | Max. elg. | 500% | 700% | Pct. wt. inc. |
|---|---|---|---|---|---|---|---|---|---|
| 35/285° F | 87 | 890 | 11 | 30 | 106 | 865 | 13 | 41 | .05 |
| 50 | 104 | 820 | 15 | 50 | 126 | 810 | 18 | 65 | .02 |
| 70 | 128 | 765 | 22 | 84 | 140 | 745 | 28 | 108 | .02 |

Reaction product of methylene dicresols (mixed) and aniline (Example 6)

| Cure in mins. | Ult. tens. | Max. elg. | 500% | 700% | Ult. tens. | Max. elg. | 500% | 700% | Pct. wt. inc. |
|---|---|---|---|---|---|---|---|---|---|
| 35/285 | 109 | 825 | 16 | 52 | 110 | 795 | 17 | 65 | .02 |
| 50 | 147 | 825 | 20 | 73 | 130 | 770 | 22 | 87 | .10 |
| 70 | 115 | 725 | 25 | 97 | 137 | 725 | 29 | 115 | .20 |

Reaction product of hydroquinone and aniline (Example 7)

| Cure in mins. | Ult. tens. | Max. elg. | 500% | 700% | Ult. tens. | Max. elg. | 500% | 700% | Pct. wt. inc. |
|---|---|---|---|---|---|---|---|---|---|
| 30/40# | 136 | 895 | 16 | 48 | 140 | 800 | 23 | 80 | -------- |
| 50 | 176 | 820 | 24 | 90 | 190 | 770 | 33 | 129 | .10 |
| 70 | 190 | 790 | 30 | 114 | 218 | 750 | 43 | 168 | .02 |

From the foregoing it is evident that the composite reaction products herein disclosed are highly suitable as age resistors of rubber and other hydrocarbon compositions which undergo deterioration under the influences of heat, light and oxygen. Not only do the products of the present invention counteract the effects of such influences, but they tend to impart other highly desirable qualities such, for example, as increased resistance to deterioration by flexing.

Other advantages are that by carrying out the procedure herein disclosed age retarders are obtained in an increased yield since the total usable product is two or three times the quantity of a single component. Furthermore, the composite products generally possess a lower melting point than the separate components thereof which could be obtained and therefore disperse more readily in rubber during the processing operations. Still another distinct advantage is that while a number of the individual compounds which are known to be present in the composite reaction products possess a pronounced tendency to bloom in rubber stocks, the composite reaction products hardly exhibit this tendency at all. This application is in part a continuation of copending application Serial No. 251,472, filed February 2, 1928.

It is to be understood that as hereinafter used the term "benzenoid" embraces phenyl and naphthyl groups, which, as preferred, do or do not contain substituents, such substituents being, for example, alkyl, alkoxy and like groups. Also, by the term "rubber" it is meant to include rubber, synthetic rubber, latex, balata, gutta percha, guayule, rubber isomers, rubber conversion products and similar materials. It will be apparent that numerous changes may be made in the procedure to be followed and the chemicals employed without departing from the inventive concept.

It is intended that the patent shall cover, by suitable expression in the appended claims, whatever features of patentable novelty reside in the invention.

What I claim is:

1. The process of preserving rubber which comprises vulcanizing in the presence of an antioxidant consisting of a composite condensation product obtained by reacting under superatmospheric conditions of temperature and pressure a primary aromatic amine with a poly hydroxy aromatic compound having the hydroxyl groups attached to ring carbon atoms.

2. The process of preserving rubber which comprises vulcanizing in the presence of an antioxidant consisting of a composite condensation product obtained by reacting in a closed vessel at a temperature of at least 200° C. for a period of at least 5 hours a primary aromatic amine with a poly hydroxy aromatic compound having the hydroxyl groups attached to ring carbon atoms in the presence of a condensation catalyst.

3. The process of preserving rubber which comprises vulcanizing in the presence of an antioxidant consisting of a composite condensation product obtained by reacting in a closed vessel at a temperature of at least 200° C. for a period of at least 5 hours a primary aromatic amine with a poly hydroxy aromatic compound having the hydroxyl groups attached to ring carbon atoms in the presence of a condensation catalyst and removing the more volatile primary amines.

4. The process of preserving rubber which comprises incorporating therein an antioxidant consisting of a composite condensation product obtained by reacting in a closed vessel at a temperature of at least 200° C. for a period of at least five hours aniline with hydroquinone in the presence of a condensation catalyst and removing the more volatile primary amines, said aniline being present in the proportion of at least one mol. per mol. of hydroquinone.

5. A rubber product that has been vulcanized in the presence of an antioxidant consisting of the composite condensation product of the condensation of a primary aromatic amine with a poly hydroxy aromatic compound having the hydroxyl groups attached to ring carbon atoms at a temperature of at least 200° C. for a period of at least five hours.

6. A rubber product that has been vulcanized in the presence of an antioxidant consisting of a composite condensation product of the condensation of aniline with hydroquinone at a temperature of at least 200° C. for a period of at least five hours in the presence of a small amount of a condensation catalyst.

7. The process of preserving rubber which comprises incorporating therein an antioxidant consisting of a composite condensation product formed by the reaction, with attendant splitting out of water, of a primary aromatic amine and a poly hydroxy aromatic compound having the hydroxyl groups attached to ring carbon atoms.

8. The process of preserving rubber which comprises vulcanizing in the presence of an antioxidant consisting of a composite condensation product obtained by condensing, with attendant splitting out of water, a primary amine of the benzene and naphthalene series with a poly hydroxy compound of the benzene and naphthalene series having the hydroxyl groups attached to ring carbon atoms.

9. The process of preserving rubber which comprises vulcanizing in the presence of an antioxidant consisting of a composite condensation product obtained by condensing, with attendant splitting out of water, a primary amine of the benzene and naphthalene series with a poly hydroxy compound of the benzene and naphthalene series having the hydroxyl groups atached to ring carbon atoms, in the proportion of at least one mol. of amine to one mol. of hydroxy compound.

10. The process of preserving rubber which comprises incorporating therein an antioxidant consisting of a composite condensation product obtained by condensing, with attendant splitting out of water, a primary aromatic amine with hydroquinone in the proportion of at least one mol. of amine per mol. of hydroquinone.

11. The process of preserving rubber which comprises incorporating therein an antioxidant consisting of a composite condensation product obtained by condensing aniline with hydroquinone, with attendant splitting out of water, in the proportion of at least one mol. of aniline per mol. of hydroquinone.

12. A method of preserving rubber which comprises incorporating therein an antioxidant consisting of a composite condensation product obtained by condensing, with attendant splitting out of water, a primary aromatic amine with a poly hydroxy aromatic compound having the hydroxyl groups attached to ring carbon atoms.

13. Rubber having incorporated therein an antioxidant consisting of a composite condensation product formed by the condensation, with attendant splitting out of water, of a primary aromatic amine with a poly hydroxy aromatic compound having the hydroxyl groups attached to ring carbon atoms.

14. Rubber having incorporated therein an antioxidant consisting of a composite condensation product formed by the condensation of hydroquinone and aniline with attendant splitting out of water.

ALBERT M. CLIFFORD.